ated under 35
United States Patent
Kozlowski et al.

(10) Patent No.: US 11,836,844 B2
(45) Date of Patent: Dec. 5, 2023

(54) MOTION VECTOR OPTIMIZATION FOR MULTIPLE REFRACTIVE AND REFLECTIVE INTERFACES

(71) Applicant: Nvidia Corporation, Santa Clara, CA (US)

(72) Inventors: Pawel Kozlowski, Truckee, CA (US); Maksim Aizenshtein, Sammamish, WA (US)

(73) Assignee: Nvidia Corporation, Santa Clara, CA (US)

( * ) Notice: Subject to any disclaimer, the term of this patent is extended or adjusted under 35 U.S.C. 154(b) by 100 days.

(21) Appl. No.: 17/686,081

(22) Filed: Mar. 3, 2022

(65) Prior Publication Data
US 2023/0281906 A1    Sep. 7, 2023

(51) Int. Cl.
*G06T 15/00*  (2011.01)
*G06T 5/00*  (2006.01)
*G06T 7/70*  (2017.01)
*G06T 7/20*  (2017.01)

(52) U.S. Cl.
CPC .............. *G06T 15/00* (2013.01); *G06T 5/002* (2013.01); *G06T 7/20* (2013.01); *G06T 7/70* (2017.01)

(58) Field of Classification Search
CPC .......... G06T 15/00; G06T 5/002; G06T 7/20; G06T 7/70
See application file for complete search history.

(56) References Cited

U.S. PATENT DOCUMENTS

| 2003/0035592 | A1* | 2/2003 | Cornog | G06T 13/80 345/646 |
| 2008/0043850 | A1* | 2/2008 | Nair | H04N 5/145 348/E7.013 |
| 2010/0103323 | A1* | 4/2010 | Wredenhagen | G06T 7/246 348/E5.062 |
| 2019/0340812 | A1* | 11/2019 | Fuetterling | G06T 9/00 |
| 2020/0020085 | A1* | 1/2020 | Pekkucuksen | G06T 5/002 |

FOREIGN PATENT DOCUMENTS

| CN | 107403413 A | * 11/2017 | ............. G06T 5/002 |
| CN | 112184575 A | * 1/2021 | ............ G06F 18/214 |

* cited by examiner

*Primary Examiner* — Ryan R Yang
(74) *Attorney, Agent, or Firm* — Hogan Lovells US LLP

(57) ABSTRACT

Systems and methods relate to the determination of accurate motion vectors, for rendering situations such as a noisy Monte Carlo integration where image object surfaces are at least partially translucent. To optimize the search for "real world" positions, this invention defines the background as first path vertices visible through multiple layers of refractive interfaces. To find matching world positions, the background is treated as a single layer morphing in a chaotic way, permitting the optimized algorithm to be executed only once. Further improving performance over the prior linear gradient descent, the present techniques can apply a cross function and numerical optimization, such as Newton's quadratic target or other convergence function, to locate pixels via a vector angle minimization. Determined motion vectors can then serve as input for services including image denoising.

20 Claims, 9 Drawing Sheets

MOTION VECTOR OPTIMIZATION FOR MULTIPLE REFRACTIVE AND REFLECTIVE INTERFACES

BACKGROUND

Image and video content are increasingly generated and displayed at higher resolutions and on higher quality displays. Approaches to rendering higher quality content are often very resource intensive, particularly for modern frame rates, which can be problematic for devices with limited resource capacity. In particular, real-time ray tracing is becoming more and more of a focus area in the art. With the push towards physically-based rendering, stochastic sampling of shading (e.g., using path tracing) has become important in real-time rendering.

As path tracing is becoming more common and feasible at interactive frame rates, some of the shortcomings of the current denoisers, that were designed to handle ray tracing effects, begin to surface. When path tracing, if an insufficient number of rays per pixel are used or paths are not traced far enough into a subject scene, then a spotty image will result, as many pixels will fail to find any light sources from their rays. As the samples per pixel are increased, the image quality becomes better and better. Path tracing thus requires significant computing power.

Spatio-temporal denoisers are most commonly used to denoise signals coming from stochastically (randomly) rendered effects, like ray traced shadows, reflections, AO, etc. One of the requirements for achieving a satisfactory rendering quality are good motion vectors. And path tracing enables long specular chains, with many interfaces, for which there is no good solution for graphics/game engines to generate reflection and refraction motion vectors, particularly where multiple interfaces and/or translucent objects are involved.

BRIEF DESCRIPTION OF THE DRAWINGS

Various embodiments in accordance with the present disclosure will be described with reference to the drawings, in which.

DETAILED DESCRIPTION

Figure 1A:
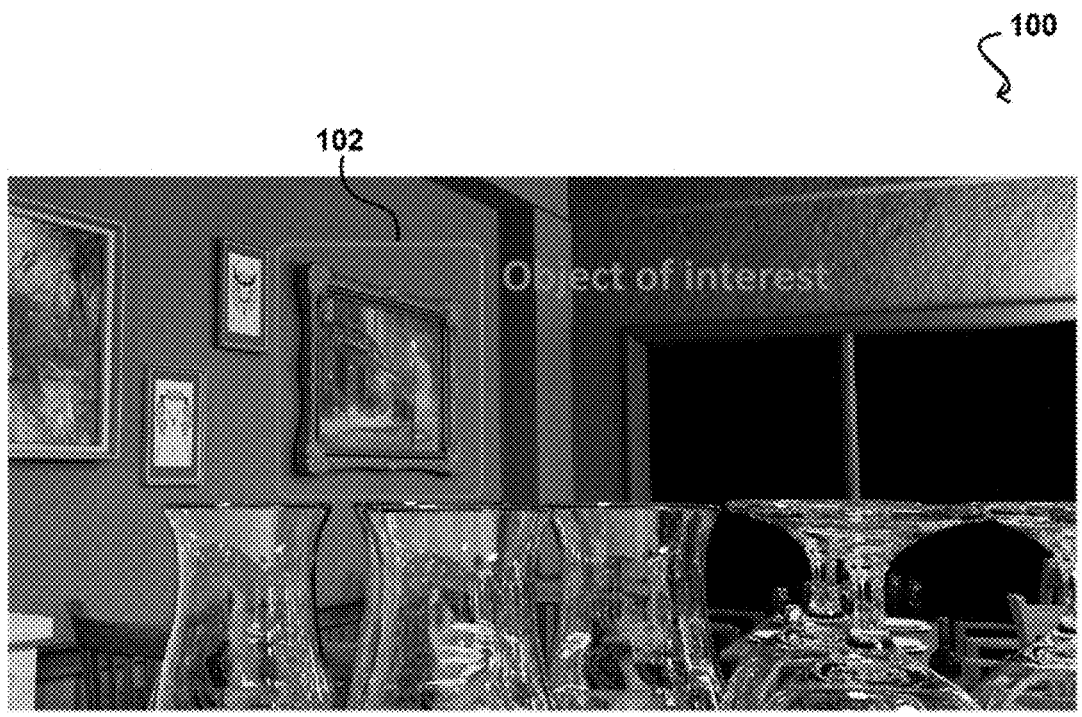
FIGS. 1A-1D illustrate an exemplary setting for generating refractive motion vectors, in accordance with various embodiments.

Approaches in accordance with various illustrative embodiments provide for determination of accurate motion vectors for an image involving translucent objects. Application settings include path-traced image denoising and/or temporal anti-aliasing ("TAA"), where it is desirable to search for, and optimize, world position and other data from past image frames and a current frame, in order to remove noise or jagged object edges in the current frame. Various applications may utilize image files, such as employed when rendering, encoding, and/or transmitting (as merely example embodiments) pictures, video frames, etc. For the avoidance of doubt, while the terms "image" and "frame" are frequently employed herein, such is for convenience, and these (and related terms) are non-limiting and include virtually any sort of still or moving imagery. In each such image, there may be various objects represented, such as may include both foreground and background objects that may be static or dynamic. The location, size, and orientation of any of those objects may change.

More specifically, various embodiments may be configured to determine accurate motion vectors, for rendering situations such as a noisy Monte Carlo integration, where image object surfaces are translucent, causing complex light reflections and refractions to arise. To optimize path tracing, ray tracing, or other forms of light transport simulation techniques for the image rendering, the present systems and methods define the background as first path vertices visible through multiple layers of refractive interfaces. To find matching world positions, the background is treated as a single layer morphing in a chaotic way during camera motion. This way, the optimized path tracing algorithm, which can minimize an angle as a cost function is some embodiments, is executed only once, not once per refractive interface. Further improving performance over the prior linear gradient descent, the present systems and methods can apply a cross function and numerical optimization, such as Newton's quadratic target or other convergence function, to locate pixels needed for rendering. In particular, instead of looking at world positions and trying to find, in a previous frame, the pixel closest to the one of interest in a current frame, the quadratic convergence examines the angle of the vector from the foreground to the world position and minimizes that angle for the targeting. The determined motion vectors can then serve as input for services including image denoising.

Path tracing is a computer graphics Monte Carlo method (repeated random sampling of beams for each pixel in a camera view) of rendering images of three-dimensional (3-D) scenes, such that the complex, global illumination appears realistic. More and more modern rendering techniques are moving toward Monte Carlo. Rather than evaluating known known light point sources, such techniques address general light transport in a scene. For simple ray tracing, one ray is sent from each pixel; but in path tracing, instead of sending out one ray, sent out are tens, hundreds, or even thousands of rays for each pixel to be rendered. When using path tracing for rendering, the rays only produce a single ray per bounce; the rays do not follow a set line per bounce, but rather shoot off in a random direction.

According to one or more embodiments, during the performance of a path tracing technique, when a collision or intersection is detected between the path being traced and a surface depicted in the scene, a path is not traced to every light source; instead, that technique bounces the ray off of the surface and continues bouncing it, until a light source is hit or a bounce limit is exhausted. A specular or refractive interface is an interface between air and a surface such as glass. At each refraction intersection or "interface" with an object in the scene, a new beam is generated pointing in a random direction. After a certain number of bounces, each beam eventually leaves the scene or is absorbed. Then the amount of light transferred all the way to the destination pixel is calculated, including any color information gathered from surfaces along the way. When a beam finishes bouncing around a given scene, a sample value is calculated based on the objects against which the beam bounced. The sample value is added to the average of the source pixel of interest.

The path tracing algorithm then takes a random sampling of all of the rays to create the final image, integrating all illuminance arriving to a single point on the surface of an object. The color of each pixel in the subject image frame is the average of all samples calculated for that pixel. In particular, one or more path tracing algorithms can average the values calculated from all the paths traced into the frame to obtain the final pixel color value, resulting in sampling a variety of different types of lighting.

As is known to those in the art, it is possible to encode rendered images as an Referentiemodel Gemeentelijke Basisgegevens Zaken ("RGBZ") ray tree. Such efforts can result in generating RGBZ ray trees with three nodes: diffuse, reflection, and refraction, and store their respective colors with depths relative to the parent node. The diffuse node depth is a traditional, linear depth buffer, and the other two contain distances from the primary surface to the reflected or refracted point. For each ray tree node (diffuse, reflection, and refraction), the world position and normal can be reconstructed from depth and its screen derivatives.

Random sampling in path tracing, however, can cause noise to appear in the rendered image. The noise may be removed by the algorithm generating more samples, i.e., color values resulting from a single beam. In other words, a problem arises in that Monte Carlo integration is noisy because it is a sampling process, and the sample include noise (i.e., random, unwanted variation of brightness or color). Such sampling needs to be somehow denoised. With the problem compounded as multiple frames are accumulated, the noisy samples increase substantially.

One of the available denoising approaches is temporal integration or temporal accumulation. Temporal accumulation entails using the input of one or more previous frames to determine if there are any artifacts in the current frame in need of correction. However, to do that when the camera or objects moves in a given scene, it is required to find a pixel where it existed in the previous frame. This is where motion vectors assist, providing a direction in screen space to the pixel in the previous frames, thereby allowing integration to continue. Temporal accumulation requires a two-dimensional (2-D) motion vector associated with each color sample for a frame. TAA, in turn, combines information from past frames and the current frame, with each pixel sampled once per frame; but, in each frame, the sample is at a different location within the pixel. Pixels sampled in past frames are blended with pixels sampled in the current frame to produce an anti-aliased image.

When presented with a surface that is opaque, obtaining the needed motion vectors for rendering, temporal accumulation, and TAA is straightforward. However, various aspects, including reflections and refractions, become significantly complex when objects or surface are transparent (such as frequently-encountered glass) objects in an image, and even more modifications are required. Prior methods merely deal with one interface or window and/or one transparency layer, and, should more interfaces be encountered, recalculations must frequently be performed.

Figure 1B:
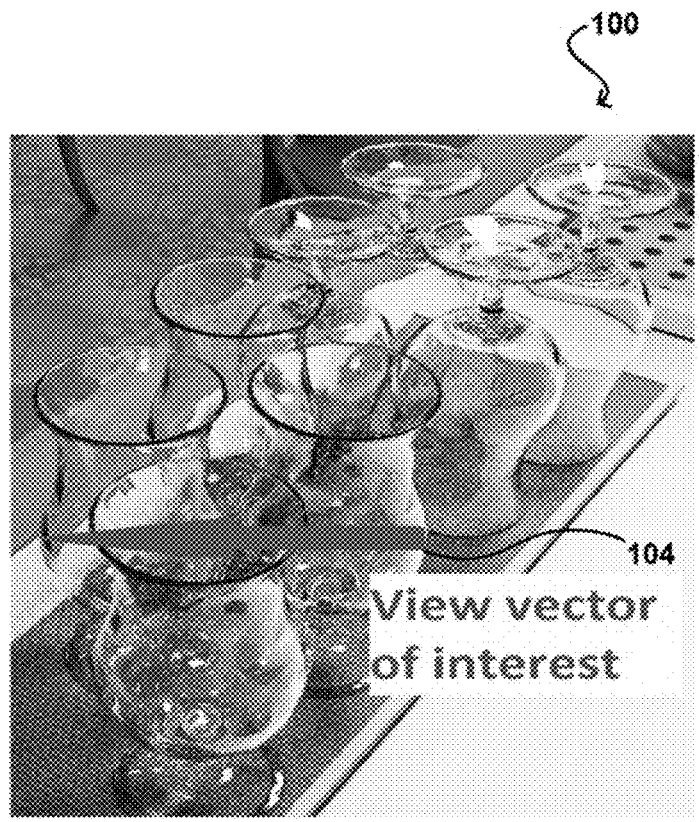

In at least one embodiment, the environment for which motion vectors are generated may include representations of one or more objects 102 in a scene, such as illustrated in the representative setting shown in FIGS. 1A through 1D. The initial image frame 100 of FIG. 1A may correspond to a frame of a video sequence. In the environment 100 of FIG. 1A, there is at least one light source (not shown); there may be fewer or additional light sources in other examples, of similar or different types. There are multiple objects other in this scene 100, including an object of interest 102. Further, there can be reflections of objects represented in this image. FIG. 1B illustrates, in the interest of clarity, a portion of the setting 100 shown in FIG. 1A, but as an overhead perspective view, approximately orthogonal. A view vector of interest 104 points in the direction of the object of interest 102 in FIG. 1A.

Pixel locations, corresponding to features of object 102 as captured by a camera that moves between frames, may be different in each of those frames. In a next or subsequent image frame, at least some of the objects may appear in different locations, poses, views, or orientations, resulting in features of these objects being represented in different pixel locations in different frames in a sequence. For example, such apparent changes in locations can be due to movement of a camera or other vantage point; the camera motion can then correspond to different pixel locations for the object of interest 102 in separate images. In at least one embodiment, and as reflected in FIG. 1C, a rendering engine or other such source may provide information about differences in pixel positions, as may correspond to motion of one or more objects between frames, through a tracking pixel 108.

Figure 1C:
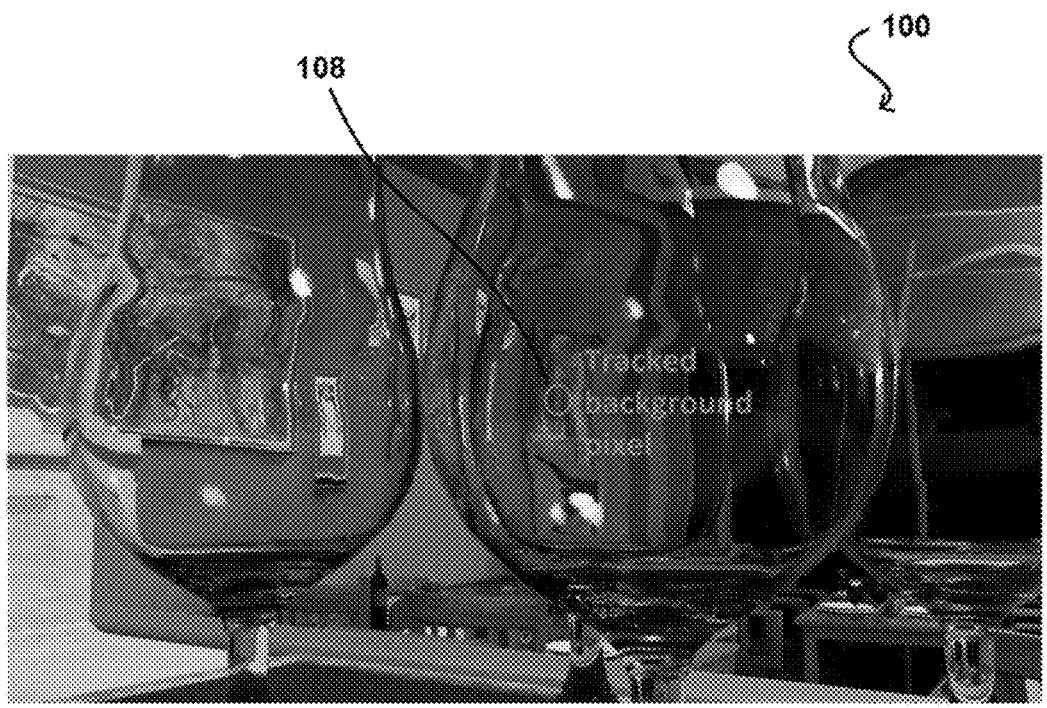
Figure 1D:
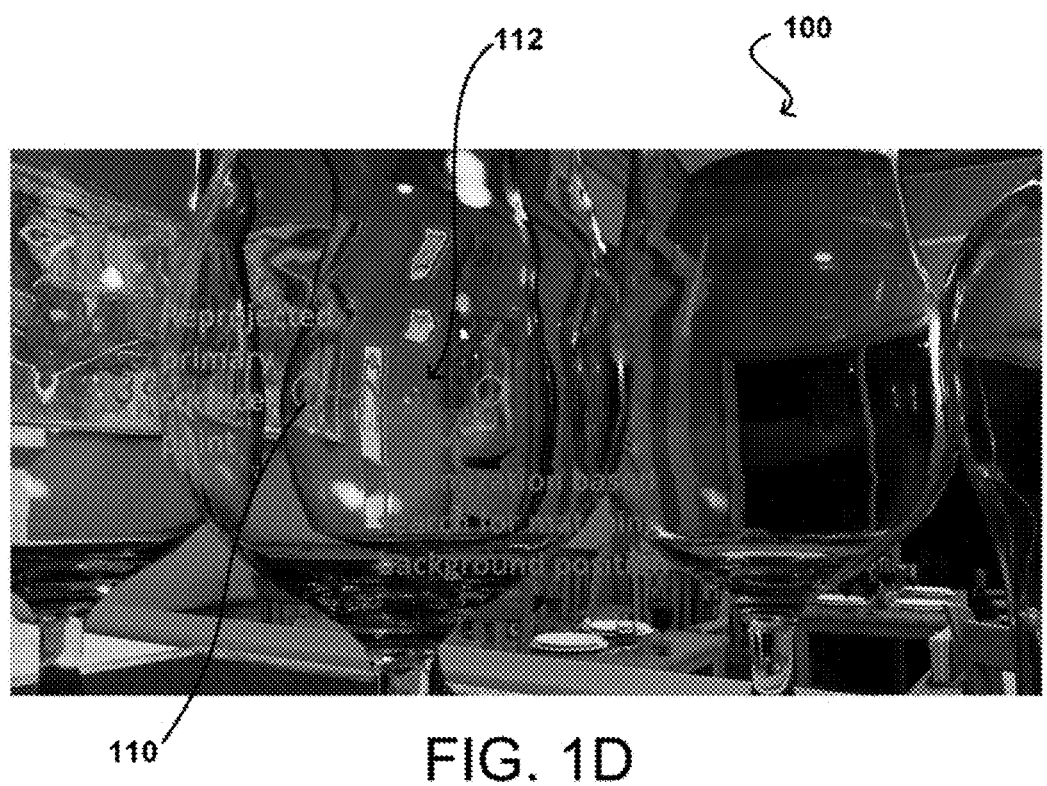

Motion can be used to represent or track these changes in pixel locations for specific features located in both frames, which effectively provide a mapping of pixel locations for features in a current image, such as FIG. 1D, to prior pixel locations for those features in previous frame(s), such as FIGS. 1A-1C. In at least one embodiment, this allows blending of color values from corresponding pixel locations to be performed, as blending based on pixel location only can produce erroneous color values since a moving camera would not have been in a same location in both frames, such that this process would result on blending color values for two different objects.

FIG. 1D illustrates how certain features of the object of interest 102 appear to have moved, due to camera movement, relative to the location of this object in the initial setting 100 of FIG. 1A. For example, one or more of the camera or light sources may have moved; this may not only impact the positions of features of those objects, but also the positions of the corresponding shadows, and the eventual determination of motion vectors. Depicted, then, is a reprojection 110 of a primary surface point, determined as part of the present optimization-based search 112 for matching image background positions.

In order to deliver a realistic representation of these frames, it can be desired to blend at least some of the "historical" pixel data of the object of interest 102 in FIG. 1A, the tracked background pixel 108 of FIG. 1C, and the pixel data of the current/updated frame in FIG. 1D. To do this, a blending process can attempt to correlate the locations of these features, at least to the extent they are represented in both frames, as well as to determine a weighting for the blending or other such aspects. One way to attempt to correlate this information is to determine the pixel motion between these two images.

In at least one embodiment, one or more motion vectors can be used to capture per-pixel, screen-space motion of geometry (e.g., objects or shapes) between or across frames in a sequence. A motion vector can be a two-(or more-) dimensional vector providing an offset or mapping from coordinates in a current image to coordinates in a prior image. There can be motion vectors provided for individual pixel locations in a current frame, such as FIG. 1D, where a corresponding feature or geometry was also represented in previous frames. For a background object that does not move between frames, whether due to object motion or camera motion or a lack thereof, then there may be motion vectors of length 0, or with coordinates of (mx, my, mx)=(0, 0, 0) for three-dimensional motion vectors, indicating that a same feature is located at a same pixel location in each of those frames. In order to reduce artifacts such as flickering or noise, color values for that pixel location from a previous frame and a current frame can be blended, in order to reduce variation. In at least one embodiment, this blending can be weighted based upon various factors or determined using a number of different functions.

Figure 2A:
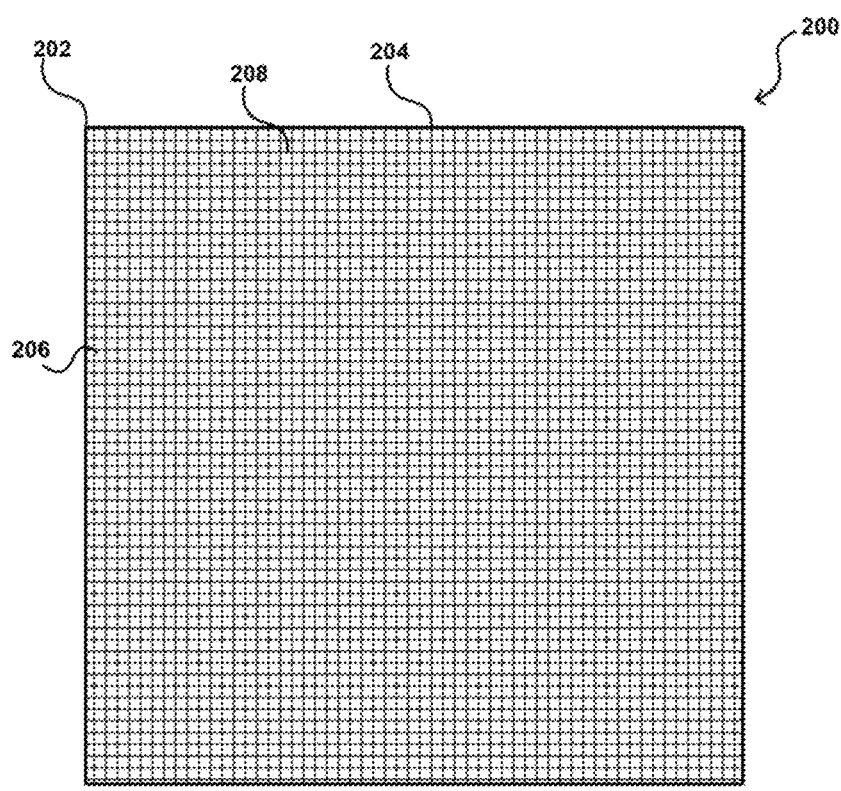
FIG. 2A illustrates an example pixel layout for an image, as used in various embodiments.

FIG. 2A illustrates an example pixel layout 200 for an image 202, where the pixel layout 200 is presented by vertical lines 204 and horizontal lines 206 that separate the image 202 into individual pixels 208. It should be appreciated that the embodiment of FIG. 2A is for illustrative purposes only, including a representation of the tracked background pixel shown in FIG. 1C, and that an image may include many more pixels. Moreover, the lines 204 and 206 are also provided as illustrative markers to show separation between adjacent pixels 208. In operation, each of the pixels 208 will have a value that corresponds to a varied brightness or intensity.

Figure 2B:
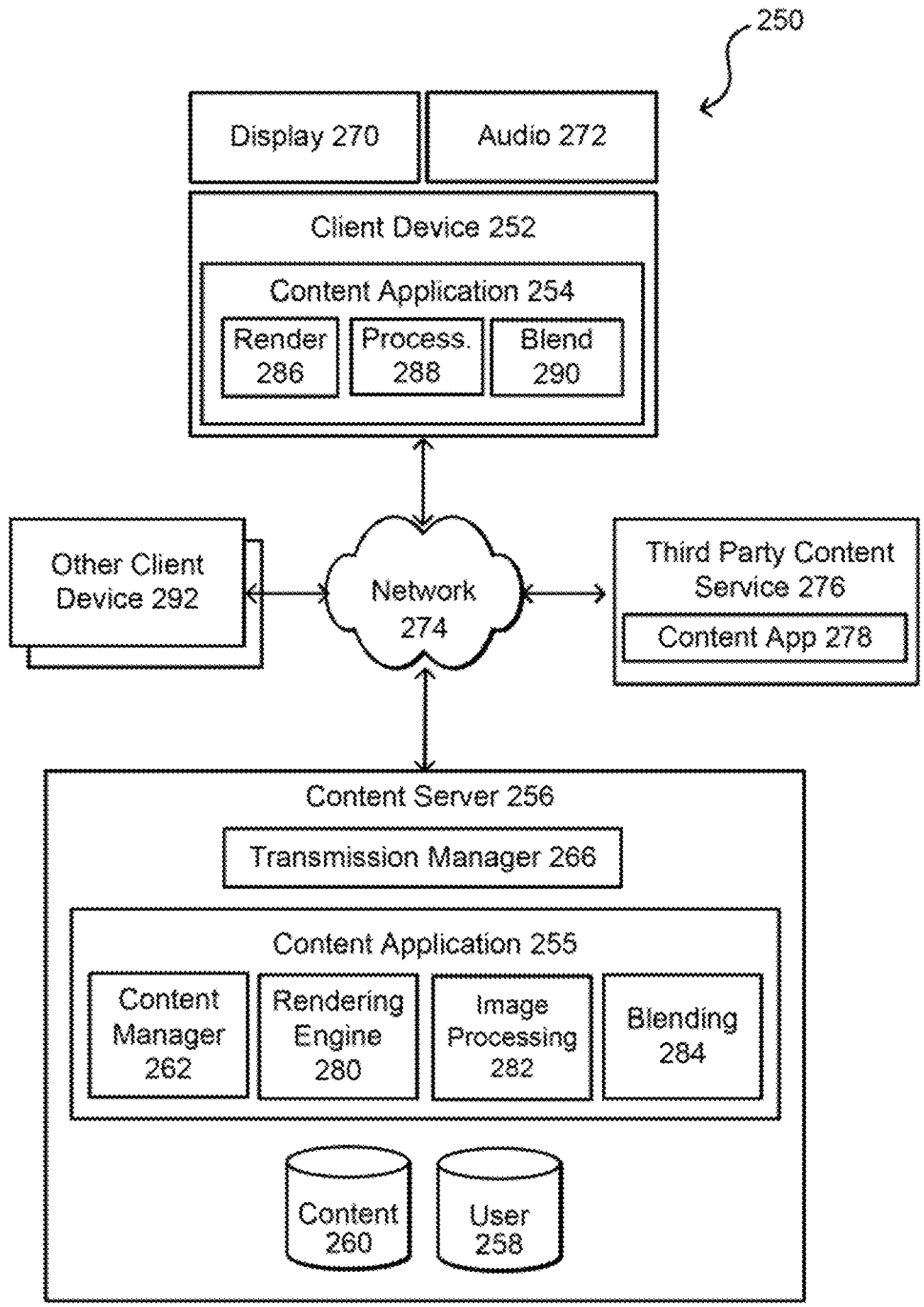
FIG. 2B illustrates components of a representative system for generating or providing image content, in accordance with various embodiments.

FIG. 2B shows certain components of an example system 250 for generating or providing the optimized motion vector-based image content described herein, including that presented on the FIG. 2A pixel basis. In at least one embodiment, a client device 252 can generate this content for a session, such as a gaming session or video viewing session, using components of a content application 254 (e.g., a gaming or streaming media application, a simulation application, or a content creation application) on the client device 252 and data stored locally. A related version of the content application 255 executing on a content server 256 may initiate a session associated with the client device 252, as may utilize a session manager and user data stored in a user database 258. The content app 254 can cause content 260 to be determined by a content manager 262 and rendered using a rendering engine 264, if needed for this type of content or platform, and transmitted to client device 252 using an appropriate transmission manager 266 to send by download, streaming, or another such transmission channel. The receiving client device 252 can provide this content to a corresponding content application 254, which may also or alternatively include a rendering engine 268 for rendering at least some of this content for presentation via the client device 252, such as video content through a display 270 and audio, such as sounds and music, through at least one audio playback device 272, such as speakers, headphones, or ear buds.

At least some of the provided content may already be stored on, rendered on, or accessible to client device 252 such that transmission over a network 274 is not required for at least that portion of the content, such as where that content may have been previously downloaded or stored locally on a hard drive, optical disk, or solid state drive. A transmission mechanism such as data streaming can be used to transfer this content from the server 256, or content database 260, to client device 252. In at least one embodiment, at least a portion of this content can be obtained or streamed from another source, such as a third party content service 276 that may also include a content application 278 for (collaboratively) generating, creating, revising, simulating, or providing content, such as 2-D and/or 3-D synthetic assets, scenes, and environments. Portions of this functionality can be performed using multiple computing devices, or multiple processors within one or more computing devices, such as may include a combination of central processing units ("CPUs"), graphics processing units ("GPUs"), and/or data processing units ("DPUs").

In some illustrative embodiments, the content application 255 includes a content manager 262 that can determine or analyze content before this content is transmitted to the client device 252. The content manager 262 can also include, or work with, other components that are able to generate, modify, or enhance content to be provided; this can include a rendering engine 280 for rendering content, such as aliased content at a first resolution. An upsampling or scaling image processing component 282 can generate at least one additional version of this image content at a different resolution, higher or lower, and can perform at least some processing such as anti-aliasing. A blending component 284, as may include at least one neural network, can perform blending for one or more images with respect to prior images, as discussed herein. The content manager 262 can then select an image or video frame of an appropriate resolution to send to client device 252. The content application 254 on the client device 252 may also include components such as a rendering engine 286, an upsampling and/or other processing module 288, and a blending module 290, such that any or all of this functionality can additionally, or alternatively, be performed on the client device 252. The content application 278 on a third-party content service system 276 could also include such functionality.

In at least one embodiment, a system 250 for content generation can include any appropriate combination of hardware and software in one or more locations. The locations where at least some of this functionality is performed may be configurable, or may depend upon factors such as a type of client device 252 or availability of a network 274 connection with appropriate bandwidth, among other such factors. Generated image or video content of one or more resolutions can also be provided, or made available, to other client devices 292, such as for download or streaming from a media source storing a copy of that image or video content. In at least one embodiment, this may include transmitting images of game content for a multiplayer game, where different client devices may display that content at different resolutions, including one or more super-resolutions.

To generate specular motion vectors (reflection or refraction), four buffers are used: primary surface world position (P), secondary surface world position (S, being either a world position of the reflection or something behind translucent objects), motion vectors (MV), and secondary surface world position from the previous frame (Spree). Assuming pixel coordinates [x,y], it is possible to define a vector curd:

$$\omega_{ref} = S[x,y] - P[x,y]$$

For an arbitrary world position s, a function $\Delta$ can be defined:

$$\Delta(\omega_{ref}, s) = \angle(\omega_{ref}, s - P[x,y]).$$

It thus is worthwhile to find the following:

$$s^*(\omega_{ref}) = \arg\min \Delta(\omega_{ref}, s) \; s \in S_{prev}$$

I.e., the world position s* from the $S_{prev}$ buffer (and its respective pixel coordinates). This optimization forms a central part of some illustrative embodiments. The process can be started with candidate $s_c$:

$$s_e = S_{prev}[[x,y]+MV[x,y]] - P[x,y]$$

And proceed by utilizing image-space derivatives of function $\Delta$ over the $S_{prev}$ buffer and any viable numerical optimization method.

For deeper paths, executing this method on each specular interface would be prohibitively expensive in most use cases. Indeed, applying prior techniques, only the simplest of scenes will suffice to do so, once at a single interface, as the difference between the correct result (warped multiple times) and the one warped only a single time is observable. Otherwise, and costly in terms of resource use, algorithms must be executed once per refractive interface. Hence, there is considerable benefit of applying present algorithms, as optimized herein in some embodiments, only once per each specular interface. Through the present systems and methods, it is possible to, in a sense, "ignore" the fact that an image frame setting involves multiple layers of refraction—rather, all layers are treated as a single layer which morphs the background in a chaotic or complex way, especially when one or more translucent objects are involved in the images, warping the view.

In some embodiments, the present systems and methods focus primarily on specular chains that went through multiple delta transmission events (e.g., roughness=0) before hitting something more diffuse (e.g., roughness >0). The first beam path vertices visible through multiple layers of refractive interfaces are defined as the background.

As noted, in at least some illustrative embodiments, motion vector data received from a rendering engine or application can be used to determine regions where geometry has moved in a given direction over two or more frames. In at least one embodiment, terms can be used for additional prior frames as well, but reducing artifacts presented from a previous frame may reduce a presence of artifacts due to all previous frames processed using this approach as well, such that there may be little additional advantage obtained for the further amount of processing and memory required, as well as any latency introduced. This new input can be determined by comparing a difference between a motion vector field for a current frame.

In various illustrative embodiments, a motion vector difference can be visualized by a difference region representing a region of pixel locations corresponding to an object in a prior frame, where ghosting artifacts would most likely occur. An input feature based on such a motion vector difference may replace another existing input feature to a generative neural network, such as a color variance mask. A motion vector difference may be used in conjunction with one or a plurality of other features in order to form a single input feature computed as a function of a motion vector difference-based feature. In at least one embodiment, this may involve using a pixel-wise weighted sum, or linear combination, of a motion vector difference buffer together with a color variance mask buffer.

Other vectors or data can be utilized, such as lower resolution backward motion vectors upsampled into other resolutions (including output resolution). In at least one embodiment, motion vectors may be transformed, such as by replacing background motion vectors with foreground motion vectors close to geometry boundaries, utilizing an appropriate dilation process. In at least one embodiment, this new input feature may be formed recursively by considering not only current and preceding frame motion vectors, but also a preceding frame feature itself.

Again, optimization methods herein can identify matching world positions and generate suitable motion vectors, even with intervening translucent objects in the image frames. In doing so, various illustrative embodiments apply any of available numerical optimization methods, including Newton's quadratic method with backtracking line search with the Armijo condition, which further improves performance over a naïve gradient descent. With Newton's method, the convergence is quadratic, while gradient descent offers only linear convergence. In some embodiments, additionally or alternatively, this is minimization via the following:

$$s^*(\omega) = \arg\min \Delta^2(\omega_{ref}, s) \; s \varepsilon S_{prev}$$

This is the square of the angle, instead of the angle directly. The reason is that the angle function is not smooth when the angle approaches 0 (its derivative has a singularity there), hence iterative methods assuming some smoothness about the function will fail to converge well. The quadratic function of the angle is smooth, creating favorable conditions for convergence.

In some embodiments of the present systems and methods, it is possible to, instead of minimizing the angle as discussed herein, employ a different cost function, such as such as A':

$$\Delta'(\omega_{ref}, s) = \text{length}(\text{normalize}(\omega_{ref}) - \text{normalize}(s - P[x,y])).$$

This, intuitively, considers squared Euclidian distance between points on a unit sphere, rather than an arc length. Yet another option would be a square of the secondary surface world position distance, although doing so may prove less robust than approaches utilizing the angle. Also, numerical iterations will suffice, including a gradient descent, but can prove slower in performance than the angle approach herein.

There can be other uses for the present techniques, even without any ray tracing or other light transport simulation techniques contemplated, if an existing rendering engine does not generate full motion vectors (such as when an animation system may be too complicated). The presently disclosed systems and methods can create a virtual plane in front of the camera and generate the motion vectors for all objects in a frame, even were, say, translucent objects may interfere with objects of interest, causing a morphed or otherwise warped view.

Approaches herein can be applied to both static and dynamic imagery, including a static background, and, in some embodiments, dynamic events in the background can be handled, although an infinite background (e.g., the sky) may lead one to include other techniques as well (e.g. history clamping). In dealing with dynamic images, including video, techniques such as the use of additional and/or longer motion vectors as well can be applied.

Again, camera movement will likely cause changes in imagery from frame to frame, at least in a form of motion of the background, compared to the primary refractive interface. For example, a camera movement to the left will make it appear that an object of interest moved to the right. In such image or video sequences, these changes in view, location, size, and orientation can be viewed as a set of motions of individual pixels used to represent the objects. Such motion of features between pixel locations in different frames can appear somewhat jagged, noisy, or jerky if only considering position information for those features in a current frame. In order to smooth the apparent motion or animation, pixel data from one or more prior frames can be blended with the pixel data for a current frame. In order to blend these pixel values, however, it is necessary to correlate the pixels representing similar object features in these different images. In at least some embodiments, it will also be appropriate to accurately light or shade those objects as they move between these frames.

Figure 3:
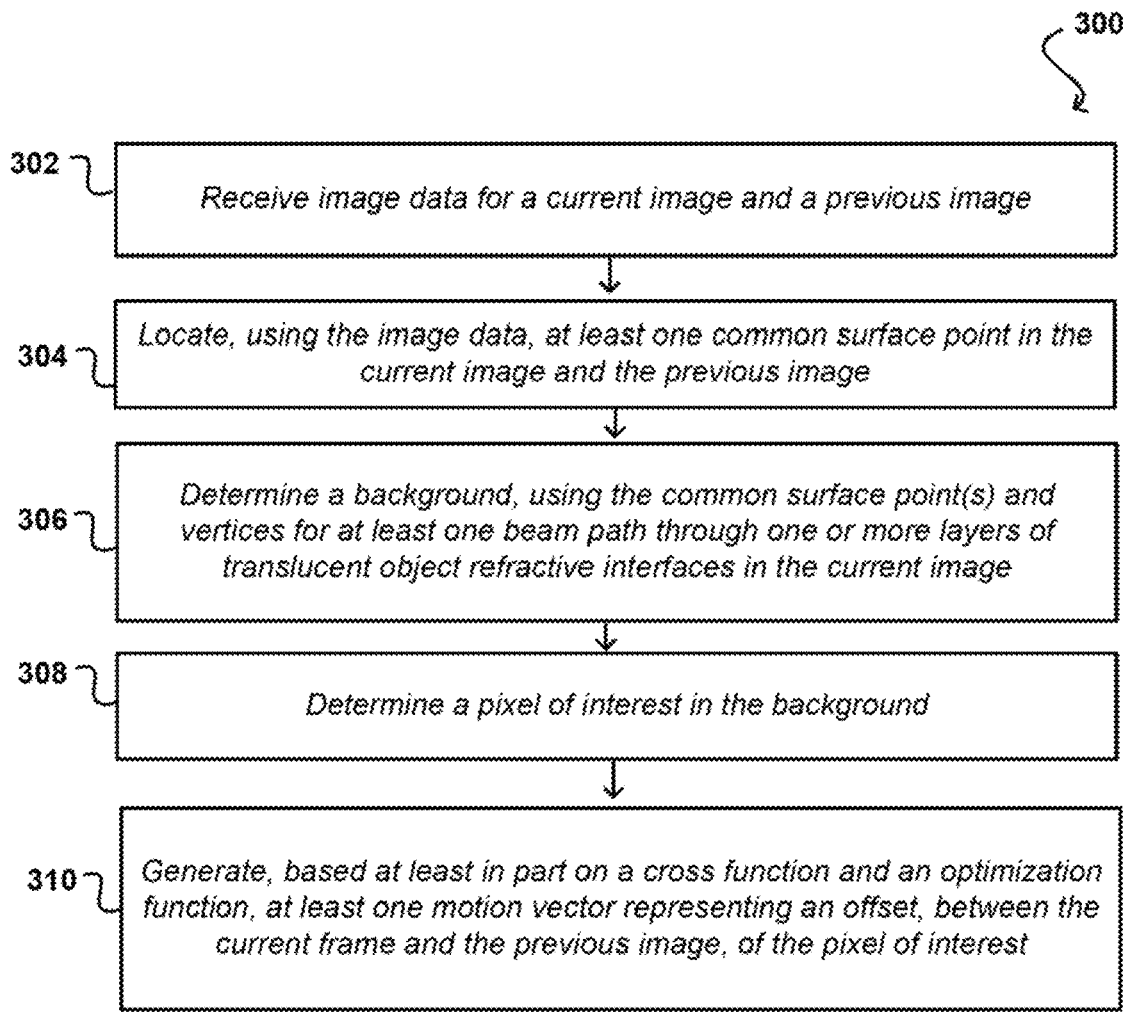
FIG. 3 illustrates a representative process flow for generating refractive motion vectors, in accordance with various embodiments.

The present systems and methods are iterative in nature, but with improved iterations, using a different, quadratic target or convergence function to locate pixels of interest in some embodiments, because the previous gradient descent is known to be slow to converge, due to more iterations being required to converge. A process 300 for generating accurate motion vectors, based on an optimization-based search for matching world positions, can be utilized as illustrated in FIG. 3. Among the applications of the process 300 is the important task of denoising a path-traced image. This optimization process 300 can be run before denoising and used to generate one or more inputs for denoising efforts. Beneficially, the optimization algorithm herein is executed once, rather than once per refractive interface.

In at least one embodiment, data is received 302 for a current or first image (including one in a sequence), such as image data received from a rendering engine or application. This image data may include data such as motion vector data, per-pixel color data, and depth data, among other such options. It can be determined what data from a previous frame is needed to apply the present techniques. Color or other data from a previous frame in this sequence can be obtained—for example, from a historical buffer.

Based at least in part on the received image data, at least one common surface point can be located 304 in the current image frame and in the previous image frame. In some embodiments, a next step entails determining 306 a background, based at least in part on the common surface point and vertices for at least one beam path visible through one or more layers of translucent object refractive interfaces in the first image frame.

In one or more embodiments, the world position of one or more pixels in the background is stored in one or more guide buffers. A pixel of interest in that background can thus be determined 308. When rendering a new frame, the systems and methods head outward from a selected, tracked, background pixel in the previous frame. In the new frame, it can be then calculated that the pixel is positioned slightly (or more) differently than in the previous frame.

Instead of looking at world positions and attempting to find, in a previous frame, the pixel closest to the one of interest in a current frame, the present systems and methods examine the angle of the vector from the foreground to the world position and minimize that. Doing so is efficient in that, in the background, there can be sizable gaps in coverage. And, should a system start the "walk" toward the object of interest position, but there is a big hole in the background, the systems will suddenly end up position-wise much farther even though, from the perspective of looking at the image, it is closer. Given this, the present systems and methods optimize the path tracing.

To this end, a further step is generation 310, based at least in part on a cross function and an optimization function, at least one motion vector representing an offset, between the first image frame and the previous image frame, of the pixel of interest. A buffer can use motion vectors to correspond to relevant pixel locations in a current frame, such as may be based upon new camera or object positions.

In some embodiments, the optimization-based search for matching world positions, used in this generation step, minimizes the angle/$\lambda 2$ as a cost function. Some embodiments do apply a gradient descent, although performance is slower when compared with use of the quadratic function, and it is possible to even analyze every pixel in a frame. Further, regardless of the number of interfaces encountered, they are treated as a single interface, accounting for the first layer and then chances of the ray path directions.

The present systems and methods can work with any graphics rendering scheme, including types of ray tracing other than path tracing, including ray tracing specifically for transparency and/or all delta interactions to pixels of interest. And, as noted herein, potential applications and projects need not be directed to denoising—the present systems and methods can also be applied for purposes such as TAA.

At least the motion vector difference data and other image data may be provided as input to a neural network or deep-learning based generator. Per-pixel weightings can then be received from this neural network, where the neural network inferred these weightings using the motion vector difference data; this can include generating adjusted weightings between current and previous color values for pixel locations determined to correspond to motion vector difference regions that have a probability of image artifacts. An output image can be generated by, in part, blending current and previous color values for individual pixels using these per-pixel weightings. The output image can be provided for presentation as part of an image or video sequence. The color data for this output image and these current motion vectors can also be stored in respective buffers, such that this data can be used to determine per-pixel weightings for a next image in the sequence.

In contrast to this process 300, without the present optimization method, a random walk to visit neighboring pixels could be performed, where, if one neighboring pixel is closest to the previous framework position, the walk will proceed in that direction. The random walk would continue in that direction that as long as it is possible to find a current world position in a previous frame. The motion vectors could be addressed in world space, as opposed to screen space or a projection, but the mathematics are far more complex and cumbersome. Performing a completely random walk in this fashion would be prohibitively expensive, so the present optimization systems and methods (including the Newton quadratic application) run far more efficiently (i.e., faster and using less in the way of computing resources).

In at least one embodiment, motion vector difference information can be used as a modality or input, as discussed herein. An additional buffer, such as a motion buffer, can be used as another source of input, by storing new or additional data persisted across frames. Current motion vectors from a motion vector buffer can be stored in one or more forms, such as may correspond to a transformation process, to be used for a subsequent frame.

Portions of the functionality herein can be performed using multiple computing devices, or multiple processors within one or more computing devices, such as may include a combination of CPUs, GPUs, and/or DPUs. Some embodiments use NVIDIA Pascal ray tracing and/or Turing-based GeForce architecture. In at least one embodiment, a renderer may be part of a rendering pipeline, such as may utilize rendering software such as Unreal Engine 4 from Epic Games, Inc., that can provide functionality such as deferred shading, global illumination, lit translucency, post-processing, and GPU particle simulation using vector fields. An amount of processing necessary for this complicated rendering of full, high-resolution images can make it difficult to render these video frames to meet current frame rates, such as at least sixty frames per second ("fps"). A renderer may instead be used to generate a rendered image at a resolution that lower than one or more final output resolutions, such as to meet timing requirements and reduce processing resource requirements. This low-resolution rendered image can be processed using an upscaler to generate an upscaled image that represents content of low resolution rendered image at a resolution that equals (or is at least closer to) a target output resolution.

A client device can generate the content for a session, such as a gaming session or video viewing session, using components of a content application on client device and data stored locally on that client device. A content application (e.g., a gaming or streaming media application) executing on a content server may initiate a session associated with at least one client device, as may utilize a session manager and user data stored in a user database, and it can cause content to be determined by a content manager and rendered using a rendering engine, and transmitted to the client device using an appropriate transmission manager to send by download, streaming, or another transmission channel. The client device receiving this content can provide the content to a corresponding content application, which may also or alternatively include a rendering engine for rendering at least some of this content for presentation via the client device, such as video content through a display and audio. At least some of this content may already be stored on, rendered on, or accessible to the client device such that transmission over a network is not required for at least that portion of content.

Approaches herein, in some embodiments, may be utilized advantageously for any application where a neural network is to improve image-related accuracy, such as for frame interpolation and/or denoising. This can reduce a presence of artifacts and utilize multiple inputs, including, but not limited to, input image luminance for a current frame, which may be in a form of a buffer of per-pixel values, as well as warped output image luminance from a previous frame. A neural network can also accept as input a proposed difference-based input feature, such as differences in motion vectors, material identifier, or depth, which may be in a form of a buffer of per-pixel values. As is known in the neural network and artificial intelligence arts, a variety of neural network types could be applied by the service operator, including, but by no means limited to, feedforward, recurrent, radial basis function, modular, and self-organizing neural networks.

In at least one embodiment, an image can be provided as input to a neural network to determine one or more blending factors or blending weights, and deep learning may be used to reconstruct images for real-time rendering. The neural network can also determine at least some filtering to be applied when reconstructing or blending a current image with a prior image. Output can be provided for presentation via a client device display or other such presentation mechanism, and a copy of an output image can also be stored to a history buffer or other such storage location, for blending with a subsequently generated image. Reconstruction speed can be accelerated with tensor cores.

It may be desirable to further reduce processing, memory, and other resources utilized in such a process. In at least one embodiment, images and input provided to a neural network can first be downsampled in order to operate the neural network at a lower resolution. The neural network can be trained at full resolution or reduced resolution, but, at an inference time, can execute at reduced resolution. Output of the neural network can be upsampled before applying for blending and filtering.

Figure 4:
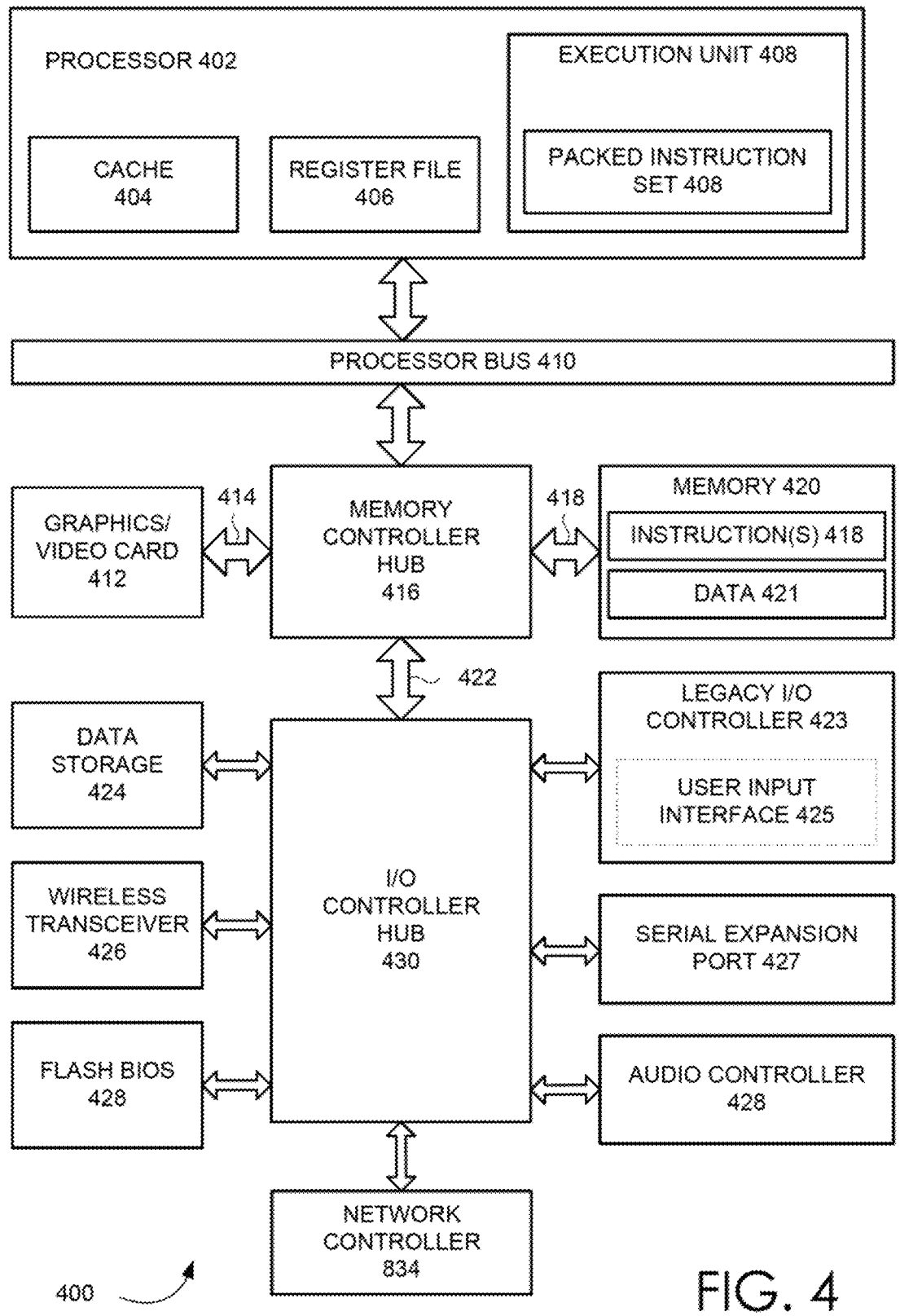
FIG. 4 illustrates components of a device for processing image content, according to at least one embodiment.

FIG. 4 is a block diagram illustrating an exemplary computer system 400, which may be a system with interconnected devices and components, a system-on-a-chip ("SOC") or some combination thereof formed with a processor that may include execution units to execute an instruction, according to at least one embodiment. The computer system 400 may include, without limitation, a component, such as a processor 402 to employ execution units including logic to perform algorithms for process data, in accordance with present disclosure, such as in embodiments described herein. The computer system 400 may include processors, such as that in the PENTIUM® Processor family or the Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and the like) may also be used. The computer system 400 may execute a version of WINDOWS® operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. Embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

The computer system 400 may include, without limitation, processor 402 that may include, without limitation, one or more execution units 408 to perform machine learning model training and/or inferencing according to techniques described herein. In at least one embodiment, the computer system 400 is a single processor desktop or server system, but, in another embodiment, the computer system 400 may be a multiprocessor system. In at least one embodiment, processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. The processor 402 may be coupled to a processor bus 410 that may transmit data signals between the processor 402 and other components in the computer system 400.

The processor 402 may include, without limitation, a Level 1 ("L1") internal cache memory ("cache") 404, and the processor 302 may have a single internal cache or multiple levels of internal cache. Cache memory may reside external to the processor 402. Other embodiments may also include a combination of both internal and external caches depending on particular implementation and needs. A register file 406 may store different types of data in various registers including, without limitation, integer registers, floating point registers, status registers, and instruction pointer registers.

An execution unit 408, including, without limitation, logic to perform integer and floating point operations, also resides in the processor 402. The processor 402 may also include a microcode ("ucode") read only memory ("ROM") that stores microcode for certain macro instructions. The execution unit 408 may include logic to handle a packed instruction set 409. By including packed instruction set 409 in an instruction set of a general-purpose processor 402, along with associated circuitry to execute instructions, operations used by many multimedia applications may be performed using packed data in the general-purpose processor 402. Many multimedia applications may be accelerated and executed more efficiently by using full width of a processor's data bus for performing operations on packed data, which may eliminate the need to transfer smaller units of data across processor's data bus to perform one or more operations one data element at a time.

The execution unit 408 may also be used in microcontrollers, embedded processors, graphics devices, DSPs, and other types of logic circuits. The computer system 400 may include, without limitation, a memory 420, implemented as a Dynamic Random Access Memory ("DRAM") device, a Static Random Access Memory ("SRAM") device, flash memory device, or other memory device. The memory 420 can store instruction(s) 419 and/or data 421 represented by data signals that may be executed by the processor 402.

A system logic chip may be coupled to a processor bus 410 and memory 420. The system logic chip may include, without limitation, a memory controller hub ("MCH") 416, and the processor 402 may communicate with the MCH 416 via the processor bus 410. The MCH 416 may provide a high bandwidth memory path 418 to the memory 420 for instruction and data storage and for storage of graphics commands, data, and textures. The MCH 416 may direct data signals between processor 402, memory 420, and other components in computer system 400 and to bridge data signals between processor bus 410, memory 420, and a system I/O 422. A system logic chip may provide a graphics port for coupling to a graphics controller. The MCH 416 may be coupled to memory 420 through a high bandwidth memory path 418, and a graphics/video card 412 may be coupled to MCH 416 through an Accelerated Graphics Port ("AGP") interconnect 414.

The computer system 400 may use system I/O 422 that is a proprietary hub interface bus to couple the MCH 416 to an I/O controller hub ("ICH") 430. The ICH 430 may provide direct connections to some I/O devices via a local I/O bus. The local I/O bus may include, without limitation, a high-speed I/O bus for connecting peripherals to the memory 420, a chipset, and the processor 402. Examples may include, without limitation, an audio controller 429, a firmware hub ("flash BIOS") 428, a wireless transceiver 426, a data storage 424, a legacy I/O controller 423 containing user input and keyboard interfaces 425, a serial expansion port 427, such as Universal Serial Bus ("USB"), and a network controller 434. The data storage 424 may comprise a hard disk drive, a floppy disk drive, a CD-ROM device, a flash memory device, or other mass storage device.

Figure 5:
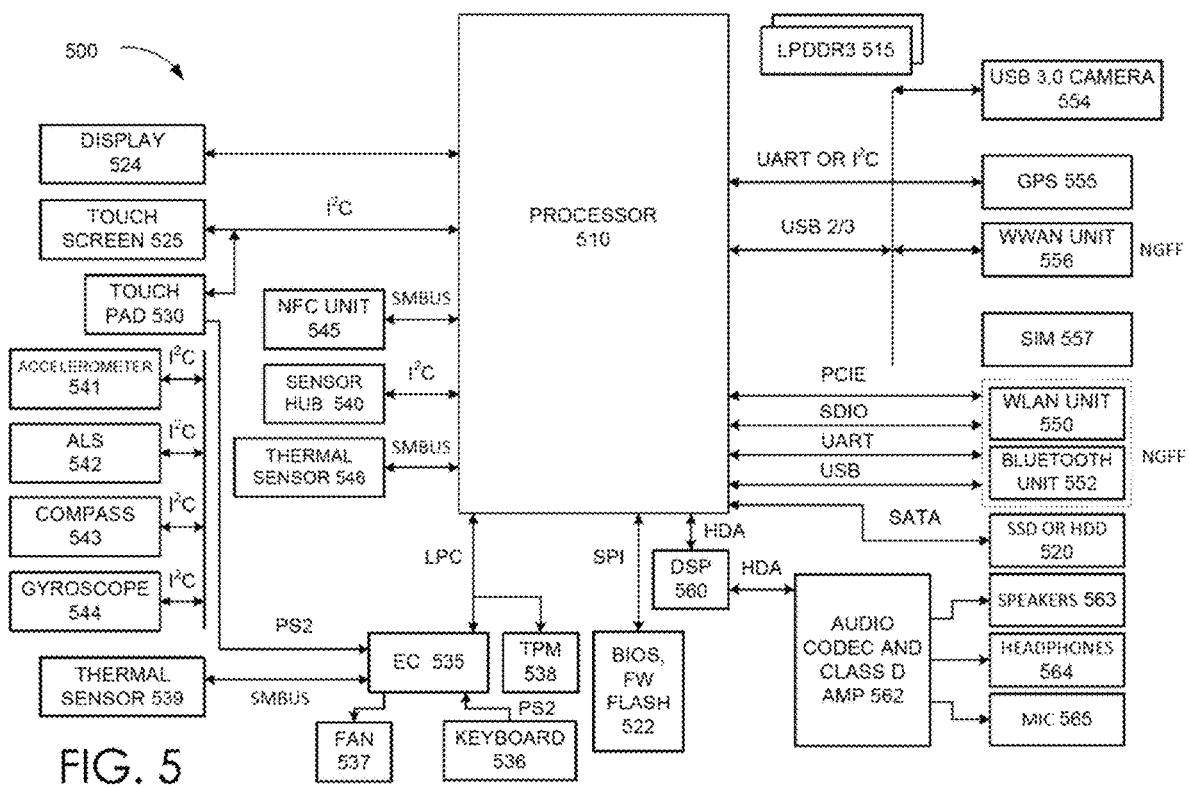
FIG. 5 illustrates a computer system, as used in various embodiments.

FIG. 5 is a block diagram illustrating an electronic device 500 for utilizing a processor 510, according to at least one embodiment. The electronic device 500 may be, for example and without limitation, a notebook, a tower server, a rack server, a blade server, a laptop, a desktop, a tablet, a mobile device, a phone, an embedded computer, or any other suitable electronic device. The device 500 may include, without limitation, a processor 510 communicatively coupled to any suitable number or kind of components, peripherals, modules, or devices. The processor 510 could be coupled using a bus or interface, such as a 1° C. bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus.

In at least one embodiment, FIG. 5 illustrates a system, which includes interconnected hardware devices or "chips", whereas in other embodiments, FIG. 5 may illustrate an exemplary System on a Chip ("SoC"). Devices and components illustrated in FIG. 5 may be interconnected with proprietary interconnects, standardized interconnects (e.g., PCIe) or some combination thereof. In at least one embodiment, one or more components of FIG. 5 are interconnected using compute express link ("CXL") interconnects.

FIG. 5 includes a display 524, a touch screen 525, a touch pad 530, a Near Field Communications unit ("NFC") 545, a sensor hub 540, a thermal sensor 546, an Express Chipset ("EC") 535, a Trusted Platform Module ("TPM") 538, BIOS/firmware/flash memory ("BIOS, FW Flash") 522, a DSP 560, a drive 520 such as a Solid State Disk ("SSD") or a Hard Disk Drive ("HDD"), a wireless local area network unit ("WLAN") 550, a Bluetooth unit 552, a Wireless Wide Area Network unit ("WWAN") 556, a Global Positioning System ("GPS") 555, a camera ("USB camera") 554 such as a USB 3.0 camera, and/or a Low Power Double Data Rate ("LPDDR") memory unit ("LPDDR3") 515 implemented in, for example, LPDDR3 standard. These components may each be implemented in any suitable manner.

Other components may be communicatively coupled to the processor 510 through components discussed herein. An accelerometer 541, Ambient Light Sensor ("ALS") 542, compass 543, and a gyroscope 544 may be communicatively coupled to sensor hub 540. A thermal sensor 539, a fan 537, a keyboard 546, and a touch pad 530 may be communicatively coupled to EC 535. A speaker 563, headphones 564, and microphone ("mic") 565 may be communicatively coupled to an audio unit ("audio codec and class d amp") 562, which may, in turn, be communicatively coupled to a DSP 560. An audio unit 564 may include, for example and without limitation, an audio coder/decoder ("codec") and a class D amplifier. A SIM card ("SIM") 557 may be communicatively coupled to a WWAN unit 556. Components such as WLAN unit 550 and Bluetooth unit 552, as well as the WWAN unit 556 may be implemented in a Next Generation Form Factor ("NGFF").

Figure 6:
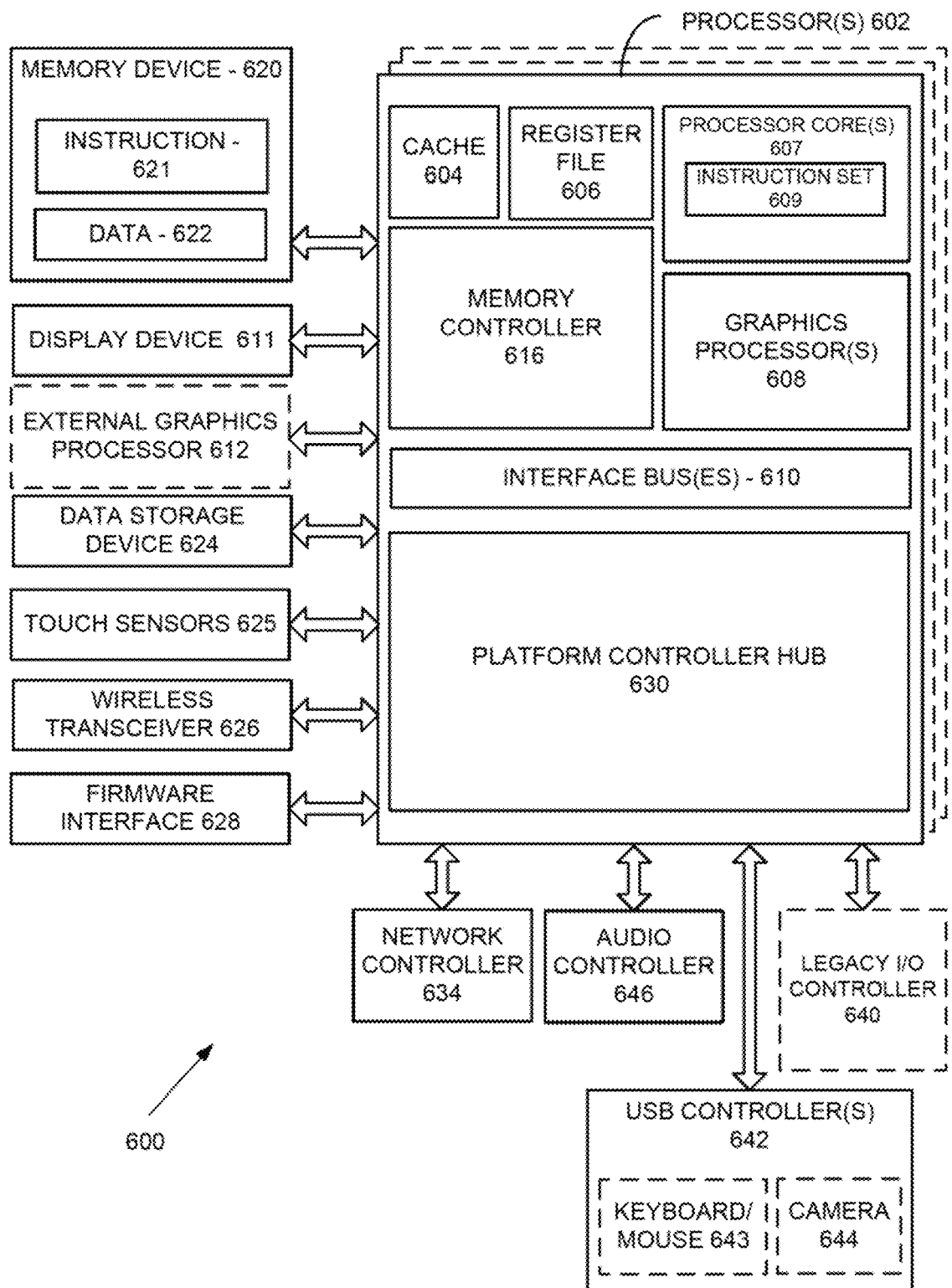
FIG. 6 illustrates at least portions of a graphics processor, as used in various embodiments.

FIG. 6 is a block diagram of a processing system 600, according to at least one embodiment. The system 600 includes one or more processors 602 and one or more graphics processors 608, and may be a single processor desktop system, a multiprocessor workstation system, or a server system or datacenter having a large number of collectively or separably managed processors 602 or processor cores 607. The system 600 can be a processing platform incorporated within a system-on-a-chip ("SoC") integrated circuit for use in mobile, handheld, or embedded devices.

The system 600 can include, or be incorporated within a server-based gaming platform, a cloud computing host platform, a virtualized computing platform, a game console, including a game and media console, a mobile gaming console, a handheld game console, or an online game console. In at least one embodiment, the system 600 is a mobile phone, smart phone, tablet computing device or mobile Internet device. The processing system 600 can also include, couple with, or be integrated within a wearable device, such as a smart watch wearable device, smart eyewear device, augmented reality device, edge device, Internet of Things ("IoT") device, or virtual reality device. The processing system 600 could be a television or set top box device having one or more processors 602 and a graphical interface generated by one or more graphics processors 608.

The one or more processors 602 each include one or more processor cores 607 to process instructions which, when executed, perform operations for system and user software. Each of one or more processor cores 607 may be configured to process a specific instruction set 609. The instruction set 609 may facilitate Complex Instruction Set Computing ("CISC"), Reduced Instruction Set Computing ("RISC"), or computing via a Very Long Instruction Word ("VLIW"). The processor cores 607 may each process a different instruction set 609, which may include instructions to facilitate emulation of other instruction sets. The processor cores 607 can also include other processing devices, such a Digital Signal Processor ("DSP").

The processor 602 can include cache memory 604, and the processor 602 may have a single internal cache or multiple levels of internal cache. In at least one embodiment, cache memory is shared among various components of processor 602. The processor 602 also uses an external cache (e.g., a Level-3 ("L3") cache or Last Level Cache ("LLC")) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). The register file 606 may include general-purpose registers or other registers.

One or more processor(s) 602 are coupled with one or more interface bus(es) 610 to transmit communication signals such as address, data, or control signals between processor 602 and other components in system 600. The interface bus 610, in one embodiment, can be a processor bus, such as a version of a Direct Media Interface ("DMI") bus. The interface bus 610 is not limited to a DMI bus, and may include one or more Peripheral Component Interconnect buses (e.g., PCI or PCI Express), memory busses, or other types of interface busses. The processor(s) 602 include an integrated memory controller 616 and a platform controller hub 630. The memory controller 616 facilitates communication between a memory device and other components of system 600, while platform controller hub (PCH) 630 provides connections to I/O devices via a local I/O bus.

A memory device 620 can be a dynamic random access memory ("DRAM") device, a static random access memory ("SRAM") device, flash memory device, phase-change memory device, or some other memory device having suitable performance to serve as process memory. The memory device 620 can operate as system memory for system 600, to store data 622 and instructions 621 for use when one or more processors 602 executes an application or process. The memory controller 616 also couples with an optional external graphics processor 612, which may communicate with one or more graphics processors 608 in processors 602 to perform graphics and media operations. The display device 611 can connect to the processor(s) 602. The display device 611 can include one or more of an internal display device, as in a mobile electronic device or a laptop device, or an external display device attached via a display interface (e.g., DisplayPort). The display device 611 may comprise a head mounted display ("HMD") such as a stereoscopic display device for use in virtual reality ("VR") applications or augmented reality ("AR") applications.

A platform controller hub 630 enables peripherals to connect to memory device 620 and processor 602 via a high-speed I/O bus. I/O peripherals include, but are not limited to, an audio controller 646, a network controller 634, a firmware interface 628, a wireless transceiver 626, touch sensors 625, a data storage device 1024 (hard disk drive, flash memory, etc.). A data storage device 624 can connect via a storage interface (e.g., SATA) or via a peripheral bus, such as a Peripheral Component Interconnect bus (e.g., PCI or PCI Express). The touch sensors 625 can include touch screen sensors, pressure sensors, or fingerprint sensors. The wireless transceiver 626 may be a Wi-Fi transceiver, a Bluetooth transceiver, or a mobile network transceiver, such as a 3G, 4G, or Long Term Evolution ("LTE") transceiver. A firmware interface 628 enables communication with system firmware, and can be, for example, a unified extensible firmware interface ("UEFI"). A network controller 634 can enable a network connection to a wired network. A high-performance network controller (not shown) couples with the interface bus 610. An audio controller 646 is a multi-channel high definition audio controller. The system 600 includes an optional legacy I/O controller 640 for coupling legacy (e.g., Personal System 2 (PS/2)) devices to system. The platform controller hub 630 can also connect to one or more Universal Serial Bus ("USB") controllers 642 connect input devices, such as keyboard and mouse 643 combinations, a camera 644, or other USB input devices.

An instance of memory controller 616 and platform controller hub 630 may be integrated into a discrete external graphics processor, such as an external graphics processor 612. The platform controller hub 630 and/or memory controller 616 may be external to one or more processor(s) 602. The system 600 can include an external memory controller 616 and platform controller hub 630, which may be configured as a memory controller hub and peripheral controller hub within a system chipset that is in communication with the processor(s) 602.

Figure 7:
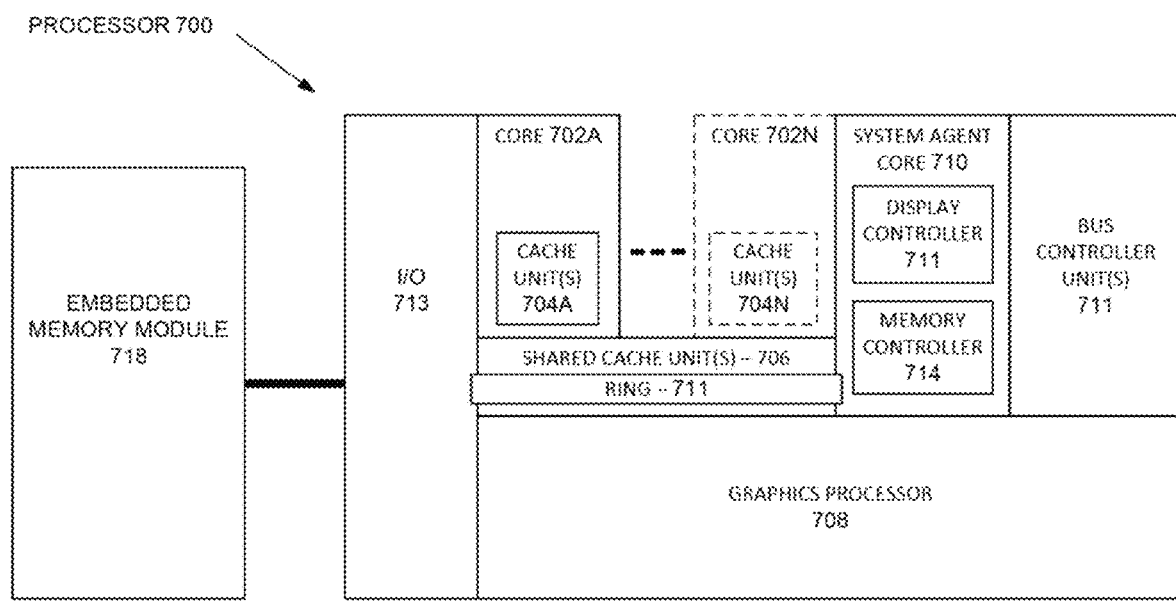
FIG. 7 illustrates at least portions of a graphics processor, as used in various embodiments.

FIG. 7 is a block diagram of a processor 700 having one or more processor cores 702A-702N, an integrated memory controller 714, and an integrated graphics processor 708, according to at least one embodiment. The processor 700 can include additional cores up to, and including, additional core 702N represented by dashed lined boxes. Each of processor cores 702A-702N includes one or more internal cache units 704A-704N, and, in some illustrative embodiments, each processor core also has access to one or more shared cached units 706.

Internal cache units 704A-704N and shared cache units 706 represent a cache memory hierarchy within the processor 700. Cache memory units 704A-704N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. Cache coherency logic maintains coherency between various cache units 706 and 704A-704N.

The processor 700 may also include a set of one or more bus controller units 716 and a system agent core 710. One or more bus controller units 716 manage a set of peripheral buses, such as one or more PCI or PCI express busses. The system agent core 710 provides management functionality for various processor components and includes one or more integrated memory controllers 714 to manage access to various external memory devices (not shown).

One or more of processor cores 702A-702N include support for simultaneous multi-threading. The system agent core 710 includes components for coordinating and operating cores 702A-702N during multi-threaded processing. The system agent core 710 may additionally include a power control unit ("PCU"), which includes logic and components to regulate one or more power states of processor cores 702A-702N and the graphics processor 708.

The graphics processor 708 couples with shared cache units 706, and system agent core 710, including one or more integrated memory controllers 714. The system agent core 710 also includes a display controller 711 to drive graphics processor output to one or more coupled displays. The display controller 711 may also be a separate module coupled with graphics processor 708 via at least one interconnect, or it may be integrated within graphics processor 708.

A ring-based interconnect unit 712 can be used to couple internal components of the processor 700. An alternative interconnect unit may be used, such as a point-to-point interconnect, a switched interconnect, or other techniques. In at least one embodiment, the graphics processor 708 couples with ring interconnect 712 via an I/O link 713.

I/O link 713 represents at least one of multiple varieties of I/O interconnects, including an on-package I/O interconnect, which facilitates communication between various processor components and a high-performance embedded memory module 718, such as an eDRAM module. Each of processor cores 702A-702N and graphics processor 708 use embedded memory modules 718 as a shared Last Level Cache.

The processor cores 702A-702N may be homogenous cores executing a common instruction set architecture. The processor cores 702A-702N can be heterogeneous in terms of instruction set architecture ("ISA"), where one or more of the processor cores 702A-702N execute a common instruction set, while one or more other cores of the processor cores 702A-702N executes a subset of a common instruction set or a different instruction set. The processor cores 702A-702N can be, additionally or alternatively, heterogeneous in terms of microarchitecture, where one or more cores having a relatively higher power consumption couple with one or more power cores having a lower power consumption. The processor 700 can be implemented on one or more chips or as an SoC integrated circuit.

Other variations are within spirit of present disclosure. Thus, while disclosed techniques are susceptible to various modifications and alternative constructions, certain illustrated embodiments thereof are shown in drawings and are described above detail. It should be understood, however, that there is no intention to limit disclosure to specific form or forms disclosed, but on the contrary, the intention is to cover all modifications, alternative constructions, and equivalents falling within spirit and scope of this disclosure, as defined in the appended claims.

Use of terms "a," "an," and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of a term "set" (e.g., "a set of items") or "subset," unless otherwise noted or contradicted by context, is to be construed as a non-empty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is understood with context to present that an item, term, etc., may be either A or B or C, or any non-empty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, or {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In some embodiments, processes described herein (or variations and/or combinations thereof) are performed under control of one or more computer systems configured with executable instructions and are implemented as code (e.g., executable instructions, one or more computer programs or one or more applications) executing collectively on one or more processors, by hardware or combinations thereof. Code is stored on a computer-readable storage medium, for example, in form of a computer program comprising a plurality of instructions executable by one or more processors. A computer-readable storage medium is a non-transitory computer-readable storage medium that excludes transitory signals (e.g., a propagating transient electric or electromagnetic transmission), but includes non-transitory data storage circuitry (e.g., buffers, cache, and queues) within transceivers of transitory signals. Code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Executable instructions are executed such that different instructions are executed by different processors—for example, a non-transitory computer-readable storage medium store instructions and a main CPU executes some of instructions while a GPU and/or a DPU executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in this specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In the present description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification, terms such as "processing," "computing," "calculating," "determining," or the like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission, or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, an image signal processor ("ISP"), an arithmetic logic unit ("ALU"), a vision processing unit ("VPU"), a tree traversal unit ("TTU"), a ray tracing core, a tensor tracing core, a tensor processing unit ("TPU"), an embedded control unit ("ECU"), and the like. As non-limiting examples, "processor" may be a hardware accelerator, such as a programmable vision accelerator ("PVA"), deep learning accelerator ("DLA"), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present the document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface ("API"). In some implementations, a process of obtaining, acquiring, receiving, or inputting analog or digital data can be accomplished by transferring data via a serial or parallel interface. In another implementation, a process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface, or an inter-process communication mechanism.

Although discussion above sets forth example implementations of described techniques, other architectures may be used to implement described functionality and are intended to be within scope of this disclosure. Furthermore, although specific distributions of responsibilities are defined above for purposes of discussion, various functions and responsibilities might be distributed and divided in different ways, depending on circumstances. And, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving image data for a first image frame and a second image frame;
locating, based at least in part on the image data, at least one surface point in common between the first image frame and the second image frame;
determining a background region, corresponding to a background depicted using the first image frame, based at least in part on the at least one common surface point and one or more vertices corresponding to at least one beam path visible through one or more layers of refractive interfaces depicted using the first image frame;
determining a pixel of interest in the background region; and
generating, based at least in part on at least one of a cross function or an optimization function, at least one motion vector representing an offset of the pixel of interest between the first image frame and the second image frame.

2. The computer-implemented method of claim 1, wherein the second image frame is at least one of a prior image or a previous image in a video sequence that also includes the first image.

3. The computer-implemented method of claim 1, wherein the generating is based at least in part on an optimization function comprising a Newtonian quadratic formula.

4. The computer-implemented method of claim 1, wherein the generation of the at least one motion vector is iterated to generate a set of motion vectors for an image.

5. The computer-implemented method of claim 1, further comprising:
applying the at least one motion vector to denoise a path-traced image.

6. The computer-implemented method of claim 5, wherein the path-traced image is rendered, at least in part, using a Monte Carlo process.

7. The computer-implemented method of claim 1, wherein the first image frame and the second image frame comprise a dynamic image sequence, and wherein historical rendering information for the dynamic image sequence is clamped in at least one buffer.

8. The computer-implemented method of claim 7, further comprising:
obtaining input regarding movement of an initial motion vector relative to a primary surface in at least one of the first image frame or the second image frame.

9. The computer-implemented method of claim 1, wherein the determination of the background region is further based at least in part on one or more object positions in one or more of the first image frame or the second image frame.

10. The computer-implemented method of claim 1, wherein the generation of the at least one motion vector is based at least in part on minimization of an angle of the at least one motion vector from a foreground point to the pixel of interest.

11. The computer-implemented method of claim 1, further comprising:
causing the at least one motion vector to be stored using a buffer, wherein the at least one motion vector is used to generate a subsequent image.

12. A system, comprising:
at least one processor; and
a memory device including instructions that, when executed by the at least one processor, cause the system to:
receive image data for a first image frame and a second image frame;
locate, based at least in part on the image data, at least one common surface point in the first image frame and the second image frame;
determine a background region corresponding to a background in the first image frame based at least in part on the at least one common surface point and one or more vertices for at least one beam path visible through one or more layers of one or more refractive interfaces depicted in the first image frame;
determine a pixel of interest in the background region;
generate, based at least in part on at least one of a cross function or an optimization function, at least one motion vector representing an offset of the pixel of interest between the first image frame and the second image frame;
render a new image based at least in part on the first image frame, the second image frame, and the at least one motion vector; and
output the new image for presentation on a display device.

13. The system of claim 12, wherein the system comprises at least one of:
a system for performing simulation operations;
a system for performing simulation operations to test or validate autonomous machine applications;
a system for performing light transport simulation;
a system for rendering graphical output;
a system using one or more multi-dimensional assets at least partially generated using a collaborative content creation platform;
a system for performing deep learning operations;
a system implemented using an edge device;
a system incorporating one or more Virtual Machines (VMs);
a system implemented at least partially in a data center; or
a system implemented at least partially using cloud computing resources.

14. The system of claim 12, wherein the generation of the at least one motion vector occurs as part of generally real-time light transport simulation of an image.

15. The system of claim 12, wherein the generation of the at least one motion vector is based at least in part on minimization of an angle of the at least one motion vector from a foreground point to the pixel of interest.

16. The system of claim 12, wherein the first image frame and the second image frame comprise a dynamic image sequence, and wherein the instructions when executed by the at least one processor, further cause the system to:
obtain input regarding movement of an initial motion vector relative to a primary surface in at least one of the first image frame or the second image frame.

17. A non-transitory machine-readable medium having stored thereon a set of instructions, which if performed by one or more processors, cause the one or more processors to at least:
receive image data for a first image frame and a second image frame;
locate, based at least in part on the image data, at least one common surface point in the first image frame and the second image frame;
determine a background region corresponding to a background depicted using the first image frame based at least in part on the at least one common surface point and one or more vertices for at least one beam path visible through one or more layers of one or more refractive interfaces depicted using the first image frame;
determine a pixel of interest in the background region; and
generate, based at least in part on at least one of a cross function or an optimization function, at least one motion vector representing an offset of the pixel of interest between the first image frame and the second image frame.

18. The non-transitory machine-readable medium of claim 17, wherein the instructions if performed further cause the one or more processors to employ one or more neural networks to develop a model for determining at least one of the at least one common surface point, the object refractive interfaces, the pixel of interest, or the at least one motion vector.

19. The non-transitory machine-readable medium of claim 17, wherein the generation of the at least one motion vector is based at least in part on minimization of an angle of the at least one motion vector from a foreground point to the pixel of interest.

20. The non-transitory machine-readable medium of claim 17, wherein the generating the motion vectors further comprises at least one of:
   rendering a graphics buffer ("G-buffer");
   rendering one or more reflections; or
   rendering one or more refractions.

\* \* \* \* \*